(12) United States Patent
Koch

(10) Patent No.: US 8,146,004 B2
(45) Date of Patent: Mar. 27, 2012

(54) GRAPHICAL USER INTERFACE TO FACILITATE SELECTION OF CONTACTS AND FILE ATTACHMENTS FOR ELECTRONIC MESSAGING

(75) Inventor: Robert Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 886 days.

(21) Appl. No.: 12/024,623

(22) Filed: Feb. 1, 2008

(65) Prior Publication Data

US 2009/0198780 A1 Aug. 6, 2009

(51) Int. Cl.
*G06F 3/00* (2006.01)

(52) U.S. Cl. ........ 715/758; 715/752; 715/753; 709/204; 709/223; 709/227

(58) Field of Classification Search .................. 715/752, 715/769, 758, 789; 709/206; 345/473
See application file for complete search history.

(56) References Cited

U.S. PATENT DOCUMENTS

| | | | | |
|---|---|---|---|---|
| 6,160,551 A * | 12/2000 | Naughton et al. | ............ | 715/769 |
| 6,344,861 B1 * | 2/2002 | Naughton et al. | ............ | 715/769 |
| 7,089,488 B2 * | 8/2006 | Hirata | ............ | 715/222 |
| 7,155,059 B2 * | 12/2006 | Yagishita et al. | ............ | 382/167 |
| 7,185,059 B2 * | 2/2007 | Daniell et al. | ............ | 709/206 |
| 7,222,156 B2 * | 5/2007 | Gupta et al. | ............ | 709/206 |
| 7,266,776 B2 * | 9/2007 | Quillen et al. | ............ | 715/758 |
| 7,434,169 B2 * | 10/2008 | Quillen et al. | ............ | 715/758 |
| 7,568,167 B2 * | 7/2009 | Van Dok et al. | ............ | 715/789 |
| 7,657,598 B2 * | 2/2010 | Daniell et al. | ............ | 709/206 |
| 7,698,649 B2 * | 4/2010 | Quillen et al. | ............ | 715/758 |
| 7,716,281 B2 * | 5/2010 | Lin et al. | ............ | 709/203 |
| 7,783,708 B2 * | 8/2010 | Zaner-Godsey et al. | ...... | 709/206 |
| 2004/0008226 A1 * | 1/2004 | Manolis et al. | ............ | 345/769 |
| 2004/0054646 A1 * | 3/2004 | Daniell et al. | ............ | 707/1 |
| 2004/0054735 A1 * | 3/2004 | Daniell et al. | ............ | 709/206 |
| 2005/0160167 A1 * | 7/2005 | Cheng et al. | ............ | 709/224 |
| 2007/0130259 A1 * | 6/2007 | Daniell et al. | ............ | 709/204 |
| 2007/0234226 A1 * | 10/2007 | Szeto | ............ | 715/769 |
| 2007/0244801 A1 * | 10/2007 | Boesel | ............ | 705/37 |
| 2009/0271486 A1 * | 10/2009 | Ligh et al. | ............ | 709/206 |
| 2010/0223568 A1 * | 9/2010 | Quek et al. | ............ | 715/765 |
| 2010/0231790 A1 * | 9/2010 | Ansari et al. | ............ | 348/552 |

* cited by examiner

*Primary Examiner* — Doon Chow
*Assistant Examiner* — David Choi
(74) *Attorney, Agent, or Firm* — Cantor Colburn LLP

(57) ABSTRACT

Selection of contacts and files for electronic messaging are facilitated by displaying a first set of graphical indicia for each of a plurality of contacts on a user contact list, displaying a second set of graphical indicia for each of one or more files stored in a data storage device, detecting a manipulation of a user interface device wherein a first graphical indicia from the first set of graphical indicia and a second graphical indicia from the second set of graphical indicia are made to at least partially overlap, and generating an electronic message for sending to a contact associated with the first graphical indicia wherein the electronic message includes a file associated with the second graphical indicia.

19 Claims, 4 Drawing Sheets

GRAPHICAL USER INTERFACE TO FACILITATE SELECTION OF CONTACTS AND FILE ATTACHMENTS FOR ELECTRONIC MESSAGING

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

TECHNICAL FIELD

Exemplary embodiments relate generally to electronic messaging and, more specifically, to a graphical user interface for facilitating selection of contacts and file attachments.

BACKGROUND

Electronic messaging is a widely accepted technique for exchanging information over communication networks. Some illustrative examples of electronic messaging include using a cellular telephone to send video or still image files over a wireless network, using a personal computer to send an instant message over the Internet, sending a text message to a cellular telephone, sending and receiving video messages in the context of internet protocol television (IPTV), sending an email message over the Internet, and others. Business professionals, students, homemakers and others spend a substantial portion of time engaged in message-related activities such as reading messages, deleting unwanted messages, responding to incoming messages, organizing a list of incoming messages that are to be saved, and re-contextualizing information received in electronic messages. Some forms of electronic messaging, such as email, utilize a store-and-forward process that enables users to decide when a message will be read, how much time will be spent reading the message, and whether or not an ongoing activity will be interrupted to read the message. Other forms of messaging are instantaneous, operating substantially in real time. In the future, electronic messaging is likely to increase considerably due to increased globalization, outsourcing, and the desire for many organizations to be geographically close to their customer base.

One feature commonly offered by electronic messaging programs is the ability to store a contact list for a user. The contact list includes a plurality of contact names each associated with a corresponding electronic destination address. The contact names may include a user's friends, family members, colleagues, and others. The list may be generated automatically in response to a user sending an electronic message to the destination address or receiving an electronic message from the destination address. Alternatively or additionally, the user may be provided with an editing mechanism for adding contacts to the list, removing contacts from the list, and changing the destination addresses associated with one or more contact names.

When the user wishes to compose an outgoing message, existing electronic messaging programs typically allow the user to search through the contact list to select one or more message recipients. The contact list is typically presented to the user in the form of a text-based graphical user interface that includes a searchable, alphabetized list of contact names. Using a mouse, pointer, keyboard, or other input mechanism, the user is able to scroll through the contact list to view a plurality of contact names. The process of selecting one or more desired message recipients from this list is tedious and time consuming, especially in situations where the user's contact list includes a number of contact names.

After the user selects one or more desired message recipients, the user may wish to incorporate one or more message attachments into the electronic message, or may wish to send a message that consists of one or more files, or both. Existing methods for attaching files to electronic messages, and for selecting files to be sent as messages, involve a multi-step procedure where a user is required to navigate through a sequence of on-screen menus in order to locate one or more desired files. More specifically, in order to locate a desired file, the user must specify the data storage drive on which the file is stored, as well as the name of the file. However, in some cases, the user may not remember where the file is stored. For example, the file could be stored on a local hard drive (i.e., the C:/ drive), a network drive, or a removable storage device. Moreover, the user may not be able to recall the name of the file.

Even if the name of the file and its storage location are known, the process of locating and selecting the file may be tedious and time-consuming. For example, a list of files available for sending is typically presented to the user in the form of a text-based graphical user interface that includes a searchable, alphabetized list of directories and files available on a specific data storage drive. Using a mouse, pointer, keyboard, or other input mechanism, the user is able to scroll through the list of directories and files to view a plurality of file names. The process of selecting one or more desired files from this list is tedious and time consuming, especially in situations where the data storage drive includes a multiplicity of file names.

In view of the foregoing, what is needed is an improved graphical user interface for electronic messaging programs that facilitates selection of electronic files and message recipients.

SUMMARY

Exemplary embodiments relate to methods, computer program products, and apparatuses for providing a graphical user interface to facilitate selection of one or more contacts and one or more files for electronic messaging. According to one set of exemplary embodiments, the methods include displaying a first set of graphical indicia for each of a plurality of contacts on a user contact list, displaying a second set of graphical indicia for each of one or more files stored in a data storage device, detecting a manipulation of a user interface device wherein a first graphical indicia from the first set of graphical indicia and a second graphical indicia from the second set of graphical indicia are made to at least partially overlap, and generating an electronic message for sending to a contact associated with the first graphical indicia wherein the electronic message includes a file associated with the second graphical indicia.

Another set of exemplary embodiments include computer program products for providing a graphical user interface to facilitate selection of one or more contacts and one or more files for electronic messaging. The computer program products include a storage medium readable by a processing circuit and storing instructions for execution by the processing circuit for facilitating a method. The method includes displaying a first set of graphical indicia for each of a plurality of contacts on a user contact list, displaying a second set of graphical indicia for each of one or more files stored in a data storage device, detecting a manipulation of a user interface device wherein a first graphical indicia from the first set of graphical indicia and a second graphical indicia from the second set of graphical indicia are made to at least partially overlap, and generating an electronic message for sending to a contact associated with the first graphical indicia wherein the electronic message includes a file associated with the second graphical indicia.

Another set of exemplary embodiments include apparatuses for providing a graphical user interface to facilitate selection of one or more contacts and one or more files for electronic messaging. The apparatuses include a display mechanism for displaying a first set of graphical indicia for each of a plurality of contacts on a user contact list and displaying a second set of graphical indicia for each of one or more files stored in a data storage device. The display mechanism is operatively coupled to a user interface device, and the user interface device is operatively coupled to a processing mechanism. In response to the processing mechanism detecting a manipulation of the user interface device wherein a first graphical indicia from the first set of graphical indicia and a second graphical indicia from the second set of graphical indicia are made to at least partially overlap, the processing mechanism generates an electronic message for sending to a contact associated with the first graphical indicia wherein the electronic message includes a file associated with the second graphical indicia.

Other methods, computer program products, and apparatuses according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
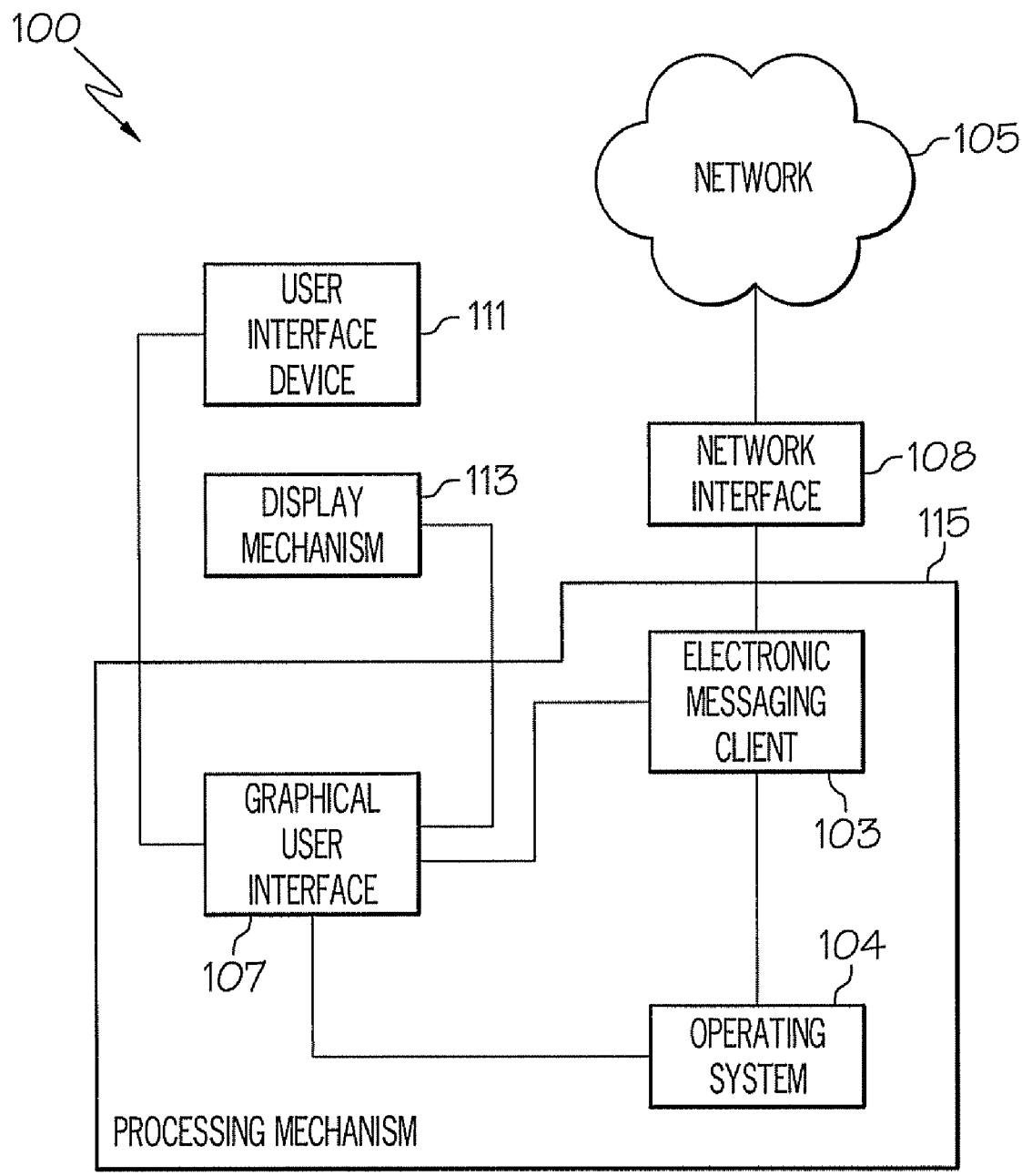
FIG. 1 is a simplified block diagram of a first exemplary communication system for providing a graphical user interface to facilitate selection of one or more contacts and one or more files for electronic messaging.

FIG. 1 is a simplified block diagram of an exemplary communication system 100 for providing a graphical user interface to facilitate selection of one or more contacts and one or more files for electronic messaging. The system 100 includes a network interface 108 operatively coupled to a network 105. A non-exhaustive list of examples for the network 105 includes wired, wireless, or optical networks such as the Internet, intranets, Ethernet networks, token rings, Universal Serial Bus (USB), wired networks according to the IEEE 1394-1995, IEEE 1394a-2000, IEEE 1394b standards (commonly known as "FireWire"), Direct Sequence-Code Division Multiple Access (DS-CDMA), Global System for Mobile Communications (GSM), North American Digital Cellular (NADC), Time Division Multiple Access (TDMA), Extended-TDMA (E-TDMA), W-CDMA, GPRS, GSM, Enhanced Data for GSM Evolution (EDGE), 3G and 4G communication, wireless local area networks such as 802.11, Bluetooth™, Zigbee™, ultra wideband (UWB), or various combinations thereof. The network 105 may include any combination of additional communication devices (not shown) such as gateways, routers, switches, and the like.

The network interface 108 represents any device or combination of devices that are capable of implementing communications between the network 105 and a processing mechanism 115. The processing mechanism 115 represents any device capable of processing data, such as a microprocessor, personal computer, laptop computer, personal digital assistant (PDA), handheld microprocessor-based device, IPTV-capable device, cellular telephone, mobile telephone, or personal communications device. The processing mechanism 115 is capable of executing an operating system 104, implementing a graphical user interface 107, and executing one or more applications including an electronic messaging client 103. The graphical user interface 107 is capable of processing information for display on a display mechanism 113 and is also capable of accepting user input from a user interface device 111.

The electronic messaging client 103 is operatively coupled to the graphical user interface 107. The electronic messaging client 103 is illustratively implemented using an email program such as Microsoft Outlook™, Lotus Notes™, a web mail application, an instant messaging application, a file transmission protocol, an internet protocol television (IPTV) messaging application, or any of various combinations thereof. The graphical user interface 107 may, but need not, be provided as part of the operating system 104. The operating system 104 may be implemented, for example, using Microsoft Windows™, MacIntosh OS™, Linux™, or any of a number of other operating systems.

The user interface device 111 represents any device capable of accepting an input from a user and converting the input into an electronic signal. For example, the user interface device 111 may be implemented using a computer mouse, tracking ball, stylus, pointer, touch-sensitive screen, keyboard, keypad, or any of various combinations thereof. The display mechanism 113 represents any device capable of displaying visual information, such as a liquid crystal display (LCD), a light emitting diode (LED) display, a plasma display, a cathode ray tube, or the like.

According to exemplary embodiments, the display mechanism 113 is controlled by the graphical user interface 107 to display a first set of graphical indicia for each of a plurality of contacts on a user contact list and also to display a second set of graphical indicia for each of a plurality of files stored in a data storage device. The first set of graphical indicia may be displayed substantially simultaneously with the second set of graphical indicia. In response to the processing mechanism 115 detecting a manipulation of the user interface device 111, such as when a first graphical indicia from the first set of graphical indicia and a second graphical indicia from the second set of graphical indicia are made to at least partially overlap on the display mechanism 113, the processing mechanism 115 generates an electronic message for sending to a contact associated with the first graphical indicia wherein the electronic message includes a file associated with the second graphical indicia.

For purposes of illustration, the electronic message may, but need not, comprise an email message wherein the file associated with the second graphical indicia is included as an attachment to the email message. Alternatively or additionally, the electronic message may comprise the file itself. Illustrative types or examples of electronic messages include any of video files, audio files, still image files, instant messages, text messages, messages sent or received in the context of internet protocol television (IPTV), an automated telephone call, or any of various combinations thereof. Different types of electronic messages may encompass store-and-forward techniques or immediate delivery substantially in real time.

Pursuant to another illustrative example, a voice mail message audio clip may be created at a first device, associated with a graphical icon, and then saved as a file in an electronic storage mechanism of the first device. Upon manipulating an input mechanism of the first device to drag the graphical icon over a contact name on a displayed contact list, the first device may send the audio clip over the network 105 in the form of an attachment to an email message. Alternatively or additionally, the first device may be programmed to recognize that the stored file is an audio clip (for example, from a file extension associated with the file), whereupon the first device retrieves a telephone number from the contact list and plays the audio clip after placing an automated telephone call to the retrieved telephone number.

Optionally, an electronic destination may be automatically selected for an electronic message based upon the type of electronic message to be sent. More specifically, when a file associated with the second graphical indicia on the display mechanism 113 is selected using the user interface device 111, an electronic destination address for a contact associated with the first graphical indicia is selected based upon the type of file selected, according to exemplary embodiments. A user profile or a system default may associate each of a plurality of electronic message types (audio, video, still image, text, etc.) with a corresponding electronic destination address corresponding to a specific device or type of device that will be used to retrieve the electronic message. For example, an audio message could be associated with an electronic destination address in the form of a telephone number, whereas a video clip could be associated with an electronic destination address in the form of an internet protocol (IP) address associated with an IPTV device. If the user interface 111 is used to drag an icon representing a Word file over the name of a selected contact, the contact's email address may be selected, whereas if the user interface 111 is used to drag an icon representing a video clip over the name of the selected contact, then the contact's IP address corresponding to the IPTV device may be selected as the electronic destination address.

In accordance with exemplary embodiments, the processing mechanism 115 generates the electronic message by pulling data from the electronic messaging client 103. Optionally, the processing mechanism 115 controls the graphical user interface 107 to initiate a display on the display mechanism 113 of a subject/comments balloon or data entry field in which a user can enter a subject or a comment or both using the user interface device 111. The processing mechanism 115 then may call the electronic messaging client 103 to send the electronic message including a file associated with the second graphical indicia to the contact associated with the first graphical indicia.

Figure 2:
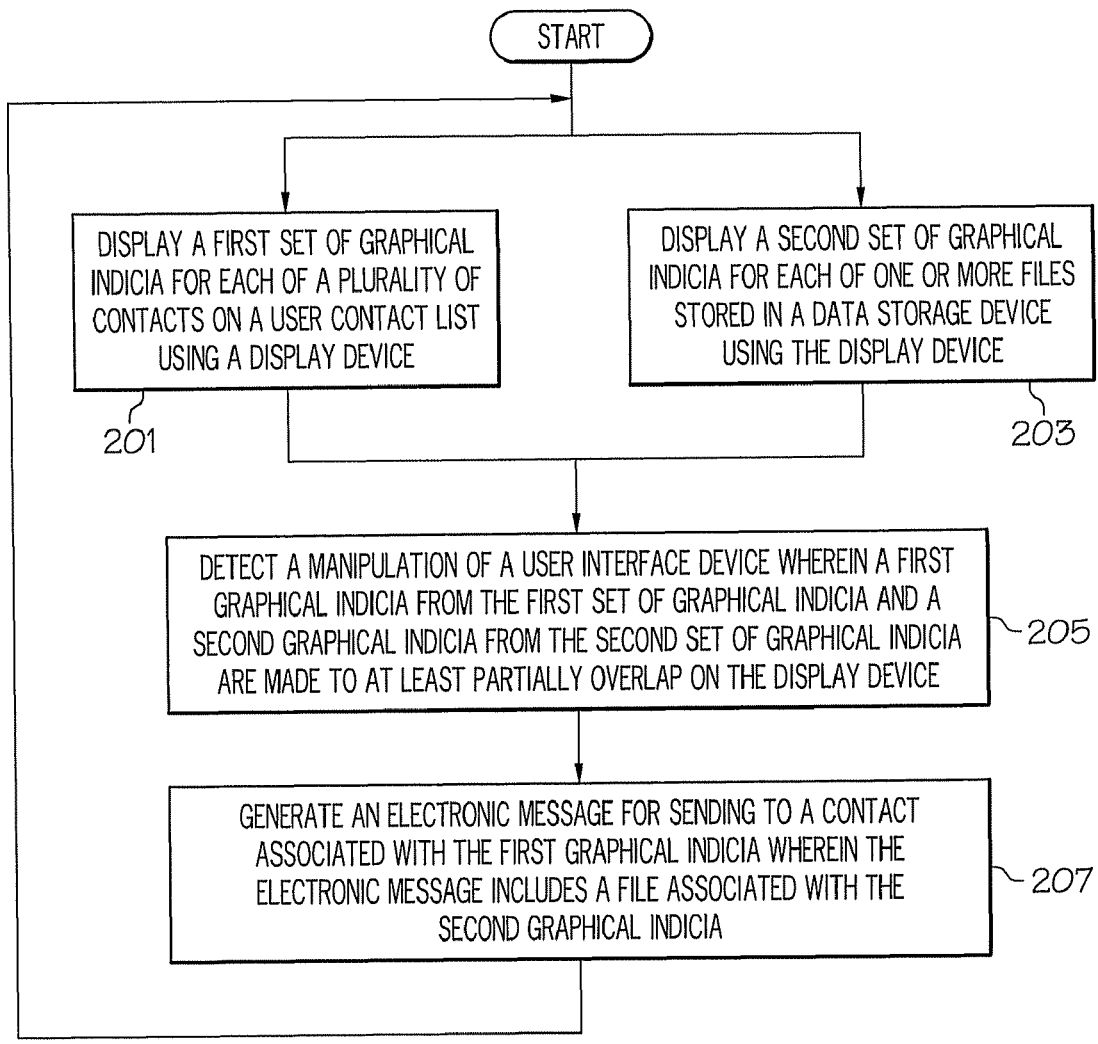
FIG. 2 is a flowchart of an exemplary procedure for providing a graphical user interface to facilitate selection of one or more contacts and one or more files for electronic messaging.

FIG. 2 is a flowchart of an exemplary procedure for providing a graphical user interface to facilitate selection of one or more contacts and one or more files for electronic messaging. The procedure commences at block 201 or block 203 or both, as these blocks can be performed simultaneously or in any order. At block 201, a first set of graphical indicia is displayed for each of a plurality of contacts on a user contact list. At block 203, a second set of graphical indicia is displayed for each of one or more files stored in a data storage device. Optionally, the first set of graphical indicia includes a plurality of contact names each associated with a corresponding electronic destination address. Optionally, the second set of graphical indicia includes one or more icons representing files on a computer desktop, files stored in a computing device, or both. The steps of blocks 201 and 203 may be performed by the processing mechanism 115 of FIG. 1.

Next, at block 205 (FIG. 2), a manipulation of the user interface device 111 (FIG. 1) is detected. The manipulation of the user interface device 11 may include causing a first graphical indicia from the first set of graphical indicia and a second graphical indicia from the second set of graphical indicia to at least partially overlap on the display device 113. At block 207 (FIG. 2) an electronic message is generated for sending to a contact associated with the first graphical indicia wherein the electronic message includes a file associated with the second graphical indicia. The steps of blocks 205 and 207 may be performed by the processing mechanism 115 of FIG. 1.

Optionally, the operations of block 207 (FIG. 2) include initiating a display on the display mechanism 113 (FIG. 1) of a subject/comments balloon or data entry field in which a user can enter a subject or a comment or both using the user interface device 111. Subsequent to performance of block 207 (FIG. 2) and irrespective of whether display of the optional subject/comments balloon or data entry field is initiated, the electronic messaging client 103 (FIG. 1) initiates sending of the electronic message including a file associated with the second graphical indicia to the contact associated with the first graphical indicia.

Figure 3:
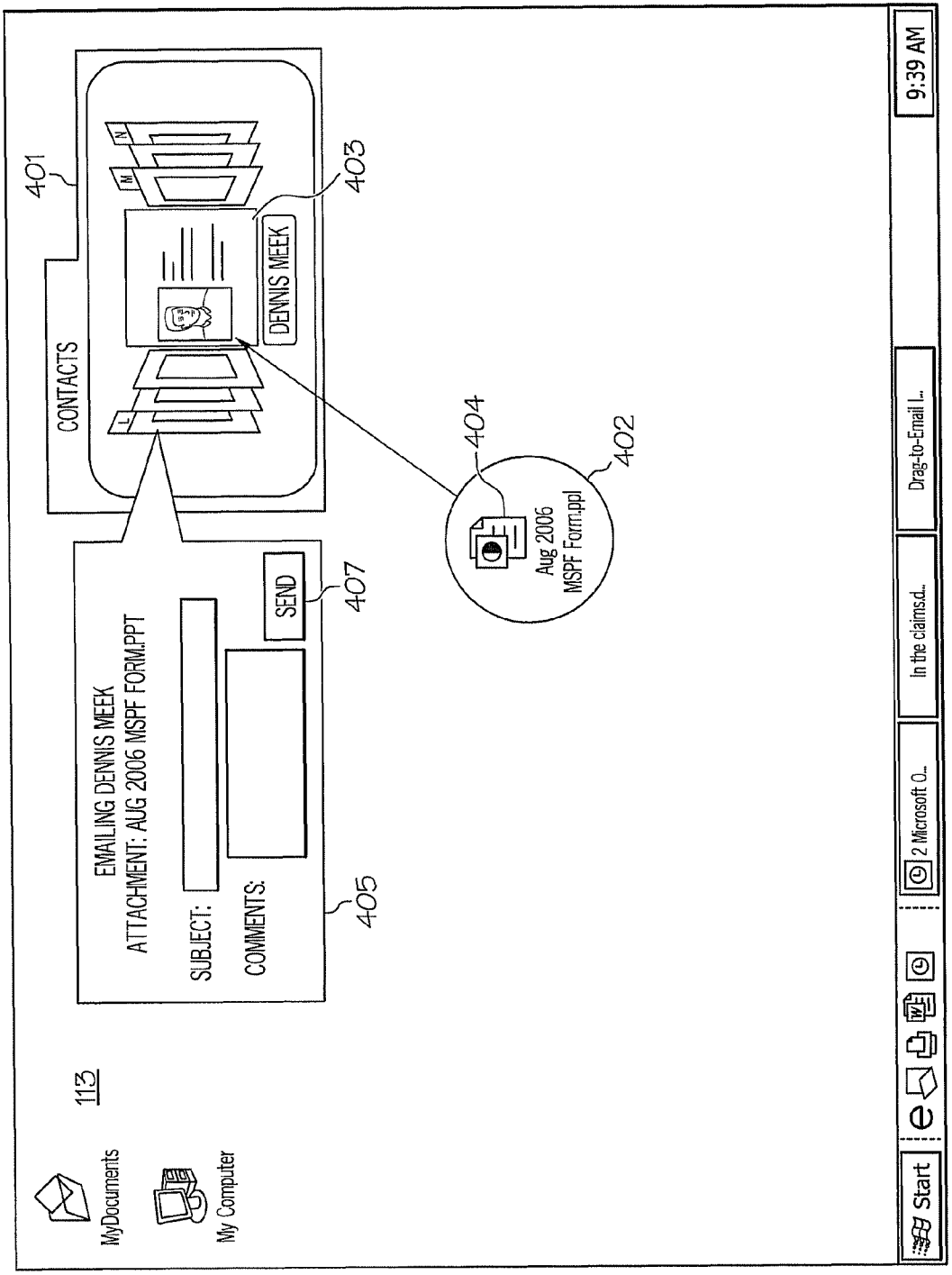
FIG. 3 illustrates an exemplary graphical user interface for facilitating selection of one or more contacts and one or more files for electronic messaging.

FIG. 3 illustrates an exemplary graphical user interface for facilitating selection of one or more contacts and one or more files for electronic messaging. The graphical user interface of FIG. 3 is displayed on the display mechanism 113 of FIG. 1. Returning to FIG. 3, a first graphical indicia 403 from a first set of graphical indicia 401 and a second graphical indicia 404 from a second set of graphical indicia 402 are made to at least partially overlap on the display device 113 (FIGS. 1 and 3). FIG. 3 illustrates an optional subject/comments balloon or data entry field 405 being displayed on the display mechanism 113 (FIG. 1). According to exemplary embodiments, a user can enter a subject or a comment or both using the user interface device 111 into the subject/comments balloon or data entry field 405. The subject/comments balloon or data entry field 405 includes a send button 407 (FIG. 3) which, when activated, initiates sending of the electronic message to the contact associated with first graphical indicia 403 wherein the electronic message includes a file associated with second graphical indicia 404.

Figure 4:
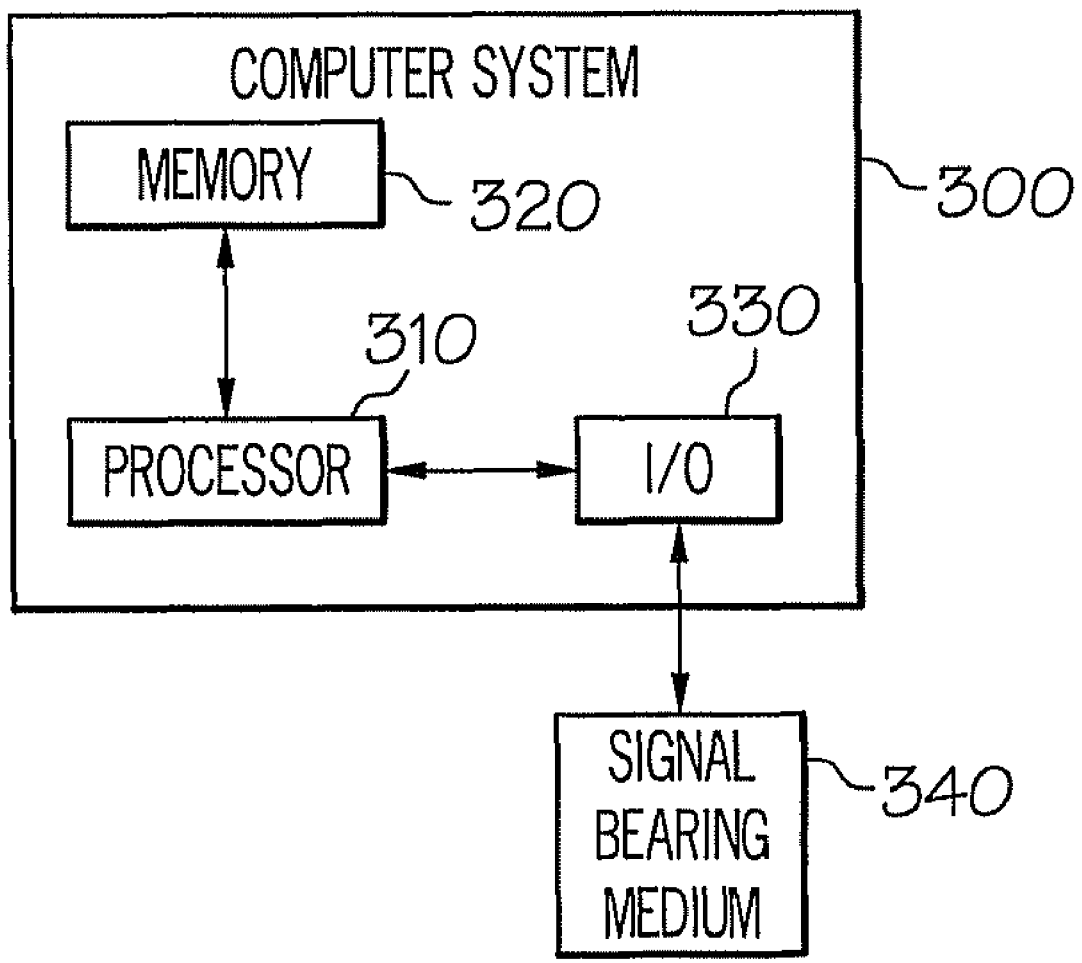
FIG. 4 is a simplified block diagram of a second exemplary communication system for providing a graphical user interface to facilitate selection of one or more contacts and one or more files for electronic messaging.

FIG. 4 is a simplified block diagram of a second exemplary communication system for providing a graphical user interface to facilitate selection of one or more contacts and one or more files for electronic messaging. The system includes a computer 300 operatively coupled to a signal bearing medium 340 via an input/output interface (I/O) 330. The signal bearing medium 340 may include a representation of a graphical user interface to facilitate selection of one or more contacts and one or more files for electronic messaging, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes the graphical user interface represented, e.g., on the signal bearing medium 340 and communicated to the computer 300 via the I/O 330, wherein the processor 310 saves information as appropriate into the memory 320. Illustratively, the processor 310 corresponds to the processing mechanism 115 of FIG. 1. Returning now to FIG. 3, the graphical user interface may also be saved into memory 320, e.g., via communication with the I/O 330 and the signal bearing medium 340. The processor 310 initiates a display of a first set of graphical indicia for each of a plurality of contacts on a user contact list; initiates a display of a second set of graphical indicia for each of one or more files stored in a data storage device; detects a manipulation of a user interface device wherein a first graphical indicia from the first set of graphical indicia and a second graphical indicia from the second set of graphical indicia are made to at least partially overlap; and generates an electronic message for sending to a contact associated with the first graphical indicia wherein the electronic message includes a file associated with the second graphical indicia. The foregoing steps may be implemented as a program or sequence of instructions within the memory 320, or on a signal bearing medium, such as the medium 340, and executed by the processor 310.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing a graphical user interface to facilitate selection of a contacts and a file for electronic messaging, the method including:
    displaying a first graphical indicia for contacts on a user contact list, the contact having a plurality of electronic destination addresses;
    displaying a second graphical indicia for a file stored in a data storage device;
    detecting a manipulation of a user interface device wherein the first graphical indicia and the second graphical indicia are made to at least partially overlap; and
    generating an electronic message for sending to the contact associated with the first graphical indicia, wherein the electronic message includes the file associated with the second graphical indicia;
    wherein generating the electronic message includes determining a file type for the file and selecting one of the plurality of electronic destination addresses of the contact in response to the file type;
    wherein generating the electronic message includes initiating an automated telephone call to a telephone number from the plurality of electronic destination addresses if the file type is an audio clip; and,
    generating the electronic message includes generating an email to an email address from the plurality of electronic destination addresses if the file type is a text file.

2. The method of claim 1 further comprising displaying a subject balloon in which a user can enter a subject.

3. The method of claim 1 further comprising displaying a data entry field in which a user can enter a subject.

4. The method of claim 1 further including sending the generated electronic message as an email to the contact associated with the first graphical indicia wherein the email includes a file attachment associated with the second graphical indicia.

5. The method of claim 1 wherein the first graphical indicia includes a contact name associated with the electronic destination addresses.

6. The method of claim 1 wherein the second graphical indicia includes an icon representing a file on a computer desktop.

7. The method of claim 1 wherein the electronic message comprises a still image file.

8. A computer program product for providing a graphical user interface to facilitate selection of a contact and a file for electronic messaging, the computer program product including a storage medium readable by a processing circuit and storing instructions for execution by the processing circuit for facilitating a method comprising:
    displaying a first graphical indicia for contacts on a user contact list, the contact having a plurality of electronic destination addresses;
    displaying a second graphical indicia for a file stored in a data storage device;

detecting a manipulation of a user interface device wherein the first graphical indicia and the second graphical indicia are made to at least partially overlap; and generating an electronic message for sending to the contact associated with the first graphical indicia, wherein the electronic message includes the file associated with the second graphical indicia;

wherein generating the electronic message includes determining a file type for the file and selecting one of the plurality of electronic destination addresses of the contact in response to the file type;

wherein generating the electronic message includes initiating an automated telephone call to a telephone number from the plurality of electronic destination addresses if the file type is an audio clip; and, generating the electronic message includes generating an email to an email address from the plurality of electronic destination addresses if the file type is a text file.

9. The computer program product of claim 8 further comprising instructions for displaying a subject balloon in which a user can enter a subject.

10. The computer program product of claim 8 further comprising instructions for displaying a data entry field in which a user can enter a subject.

11. The computer program product of claim 8 further including instructions for sending the generated electronic message as an email to the contact associated with the first graphical indicia wherein the email includes a file attachment associated with the second graphical indicia.

12. The computer program product of claim 8 wherein the first graphical indicia includes a contact name associated with the electronic destination addresses.

13. The computer program product of claim 8 wherein the second graphical indicia includes an icon representing a file on a computer desktop.

14. The computer program product of claim 8 wherein the electronic message comprises a still image file.

15. An apparatus for providing a graphical user interface to facilitate selection of a contact and a file for electronic messaging, the apparatus including:

a display mechanism for displaying a first graphical indicia for contact on a user contact list and displaying a second graphical indicia for a file stored in a data storage device, the contact having a plurality of electronic destination addresses;

a user interface device operatively coupled to the display mechanism;

a processing mechanism operatively coupled the a-user interface device wherein, in response to the processing mechanism detecting a manipulation of the user interface device such that the first graphical indicia and the second graphical indicia at least partially overlap, the processing mechanism generating an electronic message for sending to the contact associated with the first graphical indicia, wherein the electronic message includes a file associated with the second graphical indicia;

wherein generating the electronic message includes determining a file type for the file and selecting one of the plurality of electronic destination addresses of the contact in response to the file type;

wherein generating the electronic message includes initiating an automated telephone call to a telephone number from the plurality of electronic destination addresses if the file type is an audio clip; and, generating the electronic message includes generating an email to an email address from the plurality of electronic destination addresses if the file type is a text file.

16. The apparatus of claim 15 wherein the display mechanism displays a data entry field in which a user can enter a subject.

17. The apparatus of claim 15 wherein the processing mechanism sends the generated electronic message as an email to the contact associated with the first graphical indicia wherein the email includes a file attachment associated with the second graphical indicia.

18. The apparatus of claim 15 wherein the first graphical indicia includes a contact names associated with a corresponding electronic destination address.

19. The apparatus of claim 15 wherein the second graphical indicia includes an icon representing a file on a computer desktop.

* * * * *